United States Patent [19]

Heinz et al.

[11] Patent Number: 4,867,568
[45] Date of Patent: Sep. 19, 1989

[54] OPTOELECTRONIC MEASURING SYSTEM

[75] Inventors: Rieder Heinz, St. Pantaleon; Max Schwaiger, Ostermiething, both of Austria

[73] Assignee: RSF-Elektronik Gesellschaft m.b.H., Tarsdorf, Austria

[21] Appl. No.: 880,309

[22] Filed: Jun. 30, 1986

[30] Foreign Application Priority Data

Jul. 10, 1985 [AT] Austria .................................. 2036/85

[51] Int. Cl.[4] .............................................. G01D 5/36
[52] U.S. Cl. .................................................... 356/374
[58] Field of Search ........... 356/374; 250/227, 237 G; 33/125 A, 125 C

[56] References Cited

U.S. PATENT DOCUMENTS

| 3,768,911 | 10/1923 | Erickson | 356/374 |
| 4,338,518 | 7/1982 | Brienza et al. | 250/237.6 |
| 4,362,358 | 12/1982 | Hafle | 250/227 |
| 4,536,649 | 8/1985 | Kozai et al. | 250/227 |
| 4,678,948 | 7/1987 | Schmitt | 250/237.6 |

FOREIGN PATENT DOCUMENTS 76858  4/1983  European Pat. Off. .
646784 12/1984  Switzerland .

Primary Examiner—Richard A. Rosenberger
Attorney, Agent, or Firm—Collard, Roe & Galgano

[57] ABSTRACT

A scanning unit is movable relative to a scale member and is connected to a fiber optical system for illuminating a reading unit with light that has been emitted by at least one light source and transmitted by the fiber optical system to the scale member. The reading unit is connected by a fiber optical system to the scanning unit and comprises optoelectronic receivers for converting the optical signals to electric signals. It is desired to use basically the same reading and illuminating units with different scale members and to use fiber optical systems also with coding scales and high-accuracy incremental scales. At least the reading fiber optical system which connects the optoelectronic receivers to the scanning unit consists of an image-transmitting, directive fiber optical system, which has a receiving area facing the scale member. Reading aids are disposed between the opposite end of said reading fiber optical system and the optoelectronic receivers. If the scale member comprises an incremental scale, said reading aids preferably consist of scanning grids which are spaced apart by a nonintegral number of grid increments.

2 Claims, 1 Drawing Sheet

OPTOELECTRONIC MEASURING SYSTEM

BACKGROUND OF THE INVENTION

1. Field of the Invention

This invention relates to an optoelectronic measuring system, particularly to an optoelectronic system for measuring lengths or angles, comprising at least one light source, a scanning unit, which is adjustable relative to a scale member and is connected to a fiber optical system extending from said at least one light source and serving to illuminate a reading unit through the scale on said scale member, and a plurality of optoelectronic receivers spaced from the scale member and connected to the reading unit by another fiber optical system and serving to convert the optical signals received by the reading unit into electric signals.

2. Description of the Prior Art

Such a measuring system has been disclosed in No. EP-A-1 0076 858. That known measuring system serves only to detect angular adjustments and to measure angles. The scale member consists of a slitted plate, which is provided with a coarse incremental scale and is operatively connected to the rotating member to rotate in unison therewith. The slitted plate is illuminated on a light-receiving side at two spaced apart points by two fiber optical lines, which are circular in cross-section and receive light from respective light sources. The illuminating light is transmitted by the slitted plate. On the side which is opposite to the light-receiving side of the plate, a plurality of spaced apart scanning grids are provided and the slitted plate is adapted to emit the light from each of said light sources onto a pair of said scanning grids. The light transmitted by the scanning grids of each pair thereof is transmitted by respective fiber optical lines to an optoelectronic receiver, in which said light is converted to two phase-displaced signals. The receivers and the light sources can be accommodated at a protected location remote from the scanning unit.

No. CH-A-646 784 discloses an incremental length measuring system in which a coarse incremental scale provided on a light-transmitting scale member is illuminated at two spaced apart points with light emitted by respective positive lenses connected to respective fiber optical lines. The light transmitted by the scale member is subsequently transmitted by a scanning grid to light receivers. During the scanning movement, the scanning grid is displaced relative to the scale member. The light receivers collect the received light and transmit it through fiber optical lines to optoelectronic receivers, which generate electric signals which are representative of the illumination and can subsequently be evaluated. In a modified arrangement, the light transmitted by the scale member illuminates a reflecting scanning grid, which is movable relative to the scale member in unison with the adjacent ends of the fiber optical lines, and the fiber optical lines are connected at their other end to light-directing means, which preferably consist of semitransparent mirrors so that the same fiber optical lines can be used to conduct the illuminating light to the scale member and to conduct the reflected light, which has been deflected by the oblique mirrors, to the optoelectronic receivers.

Both known measuring systems comprise nondirective fiber optical lines and the magnitude of the signals generated by the optoelectronic receivers corresponds to the mean illumination of the illuminated area of said optical lines. For this reason the systems can be used only to scan coarse incremental scales. Owing to the use of projecting optical systems, collecting optical systems and scanning grids, all of which must be spaced from the scale member, the scanning unit necessarily has a relatively large overall size and involves a high expenditure. The overall design must exactly be adapted to the measuring system which is employed.

Other scanning units have been used for highly accurate measurements by means of incremental scales having small increments, and for measurements using coding scales, in most cases multi-track absolute scales, which may have an incremental scale track as the scale track having the smallest pitch. In such known scanning units the optoelectronic receivers are mounted close to the scale member on the reading unit which is movable relative to the scale member. Where coding scales are used, coded signals are generated, which correspond to the ratio of the bright and dark areas of the coding tracks in the area being read and said signals are evaluated for the measurement, e.g., for an indication of the measured length or of the measured angle. Incremental scales are used in combination with counting circuits, which count the number of increments traversed from a fixed or selected point of reference on the scale and provide the result of the measurement with a sign that depends on the direction of the scanning movement. In most cases the incremental scale consisting of bright and dark fields is read by means of grids which consist of bright and dark fields and are offset by a non-integral number of grid line spacings. In that case, the scanning movement results in sinusoidal brightness and signal variations and the wavelength of the generated signals equals the scale increment. The zero crossings of said signals can be decoded and counted. Multiplier circuits consisting in most cases of potentiometer circuits may be used for an additional electronic subdivision of the scale increments. Alternatively, the signals generated in response to the scanning movement may be delivered to an interpolating computer, which provides for an even finer subdivision of the scale increments. Suitable evaluating circuits are well known in the art. But such circuits have previously been used or usable only in measuring systems in which the optoelectronic receivers and the associated scanning grids are close to the scale member because otherwise the generated signals cannot be evaluated to give definite results if the incremental scale has very small increments of an order of one-tenth or one-hundredth of a millimeter. The optoelectronic receivers may consist of photodiodes or phototransistors. The scale may be illuminated with incident light, e.g., by means of photodiodes associated with respective scanning grids, or by a common illuminating system, or may be illuminated with transmitted or reflected light. The mode of illumination will depend on the arrangement of the illuminating system relative to the scale and on the optical transmission of the scale member. Other illuminating systems have been proposed in which a common light source delivers light through non-directive glass fiber optical lines to various areas to be illuminated. Such an arrangement provides for a large latitude regarding the mounting of the light source within the scanning unit and even if a relatively high illumination is required will result only in a small temperature rise of the scale member because the heat delivered by the illuminating system can be dissipated.

SUMMARY OF THE INVENTION

It is an object of the invention to provide a measuring system which is of the kind described first hereinbefore and which permits the use of a simple arrangement comprising glass fiber optical systems for use also with highly accurate incremental measuring systems including small-increment scales, and coding measuring systems, so that those parts of the illuminating and reading means which cooperate with the scale member can be simplified and may be smaller than before and may be constituted by rugged parts which are not likely to be deranged. Nevertheless an accurate reading of the scale member should be ensured.

This object is accomplished in that at least the reading fiber optical system connecting the optoelectronic receivers to the scanning unit consists of an image-transmitting, directive fiber optical system, which has a receiving area facing the scale, and reading aids, particularly scanning grids spaced apart by a non-integral number of grid line spacings, are attached to the other end of the reading fiber optical system and disposed between the latter and the optoelectronic receivers.

The directive fiber optical system effects a transmission of an image. The reading aids required where incremental scales are used will consist in most cases of reading grids and may be disposed between the reading fiber optical system and the optoelectronic receivers. As a result, the scanning unit is structurally simple on the reading side and its structure will basically be the same regardless of the nature of the incremental scale or coding scale which is to be scanned. The reading aids and the receivers may be integrated in an evaluating circuit. For instance, they may structurally be incorporated in a signal-evaluating or signal-indicating unit. In a modified arrangement, the brightness variations which are generated during the scanning of the incremental scale and correspond to the scale increments may be generated in that the scale is illuminated through suitable grids, which are spaced apart by a non-integral number of grid line spacings. In such an arrangement said illuminating grids will be interposed between the illuminating system and the scale and will be illuminated from the adjacent end of the directive fiber optical system. The scale may be illuminated with incident, transmitted or reflected light.

Where coding scales are used, a definite association of the area being read may be ensured in that a reading edge is optically generated or the illumination is restricted to an area which is defined by a sharp reading edge.

A new measuring and evaluating method can be carried out if the illuminating system illuminates the scale through grids having a grid line spacing which is equal to the increment of the scale consisting of an incremental scale and through a properly directed fiber optical system. If identical grids are used for the illumination of the scale and for receiving light from the scale, and the illuminating and reading grids are equally directed, a distortion of the signal generated on the reading side will indicate an angular misalignment of the scanning unit relative to the scale. Alternatively, the illuminating grid might be offset by a non-integral number of grid line spacings relative to the reading grid so that the generated signals will have a typical waveform. This may be desirable for interpolating calculations and will permit the reading line to be defined more exactly than before. If the illuminating and reading grids have a grid line spacing which equals the scale increment and are spaced apart by a plurality of scale increments and one-fourth of a scale increment, the signal generated in response to the scanning movement will have a frequency that is twice the frequency that is generated in response to constant light received by the same reading grid.

A system comprising an incremental scale may incorporate illuminating and reading means which are connected to fiber optical systems and respectively serve to illuminate and read reference marks provided on the scale member.

DETAILED DESCRIPTION OF THE PREFERRED EMBODIMENT

Figure 1:
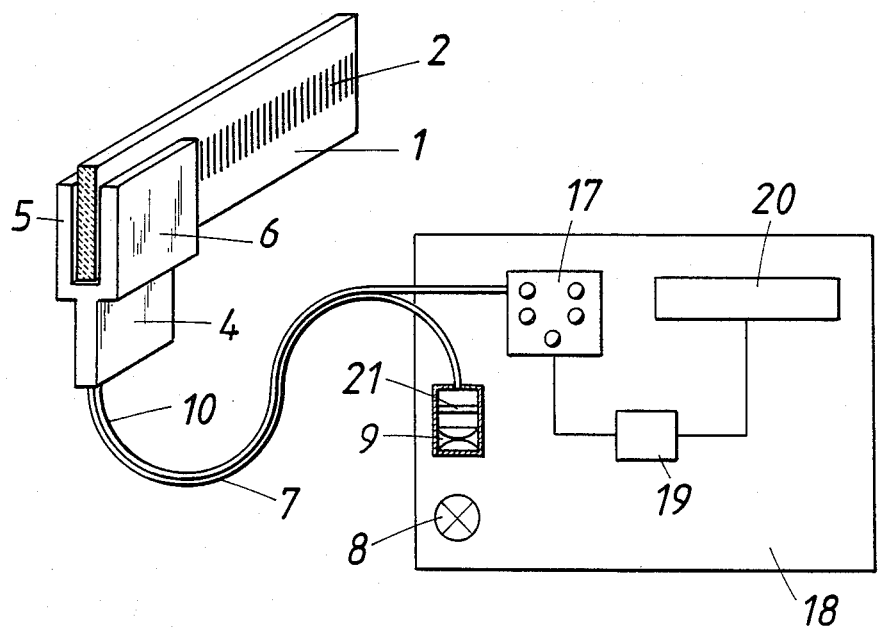
FIG. 1 is a diagrammatic view showing an incremental length-measuring system embodying the invention.

Further details and advantages of the invention will become apparent from the following detailed description of the drawing.

An incremental length-measuring system comprises a scale member, which consists of a glass bar 1 and has a wide central track consisting of an incremental scale 2 and at one edge has an edge track provided with one or more reference marks 3.

Figure 2:
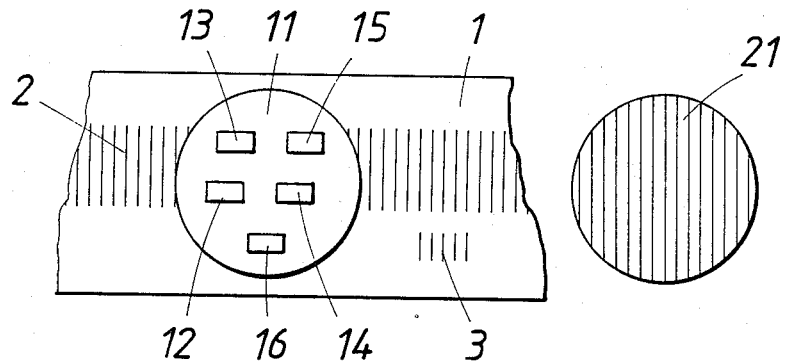
FIG. 2 is a top plan view showing on a highly enlarged scale the scale member of the system of FIG. 1, and also showing reading means disposed over the scale member and illuminating means disposed beside the scale member.

A reading unit 4 is movable along the scale member 1 and, for instance, comprises an elongate plate, which extends between sealing lips into a tubular housing, which accommodates the scale member 1. On the front and rear sides of the scale member 1, the plate carries respective brackets 5, 6, each of which is connected to one end of an image-transmitting, directive fiber optical system 7 and 10. The fiber optical system 7 connected to the bracket 5 is connected to illuminating means, which comprises a lamp 8 and a condenser 9 succeeding said lamp. The scale member 1 is illuminated from the rear by the fiber optical system 7 connected to the bracket 5. The fiber optical system 10 connected to the bracket 6 extends out of the scanning unit 4 and transmits an image from its receiving end to a scanning plate 11, which is disposed at the free end of the fiber optical system 10 and is shown in FIG. 2. That scanning plate carries four scanning grids 12, 13, 14, 15 for scanning the scale 2 and a scanning grid 16 for scanning the reference mark or marks 3. The scanning grids are spaced apart by a plurality of scale increments and one-fourth of a scale increment. It has already been mentioned that the scanning plate is connected to the free end of the fiber optical system 10. A printed circuit board 18 disposed on that side of the scanning plate 11 which is opposite to the fiber optical system 10 comprises a plurality of optoelectronic receivers 17, which are in register with respective ones of the scanning grids 12 to 16. The printed circuit board 18 carries also an evaluating unit 19 for evaluating the signals generated by the receivers 17 in response to the light emitted by the grids 12 to 16. The evaluating unit 19 is succeeded by counting and indicating means 20. In known manner, the system may be provided with direction-detecting stages for detecting the direction of movement and for determining the counting sense. The fiber optical system 10 transmits the image of the instantaneously scanned portion of the scale to the evaluating unit. By the grids 12 to 16, the light transmitted by the fiber optical system 10 is modulated to have a bright-dark sequence, which is then converted to electric signals. Grids may also be used to illuminate the scale member 2. In that case the condenser unit 9 may incorporate a filter plate 21, which comprises illuminating grids in a pattern which is a mirror image of the grids on the scanning plate 11. In that case a given scale portion or reference mark will be illuminated as it moves past a given illuminating grid and will be read through an identical one of the reading grids 12 to 16. Another embodiment is indicated in FIG. 2. In that case the scale member is illuminated by means of a grid plate 21 and the fiber optical system 7 and the grid line spacing of the grid plate 21 is equal to a scale increment. It will be understood that the scale is illuminated through the fiber optical system 7 on one side and is read through the fiber optical system 10 on the exactly opposite side. The plates 11 and 21 are shown laterally spaced apart in FIG. 2 for the sake of clarity.

It will be desirable in many cases to use a scale having a scale increment which is an integral multiple of the fiber diameter of the fiber optical systems 7, 10. The scanning plate 11 and the grid plate 21 may be directly joined to the end of a suitable round light optical fiber cable 7 or 10, respectively.

We claim:

1. An optoelectronic incremental measuring system comprising
   (a) a light-transmitting scale member provided with a light-modulating incremental scale,
   (b) light source means,
   (c) a scanning unit movable along the scale member for scanning the incremental scale,
   (d) a first image-transmitting, directive fiber optical system having one end arranged to receive light from the light source means and to transmit the light to an opposite end connected to the scanning unit, the opposite end being arranged to illuminate the light-transmitting scale member and to project an image of the light-modulating scale,
   (e) a second image-transmitting, directive fiber optical system having one end arranged to receive the projected image of the light-modulating scale and to transmit optical signals corresponding to the projected image of the light-modulating scale to an opposite end,
   (f) a scanning member at the opposite end of the second fiber optical system, the scanning member carrying
      (1) a plurality of spaced scanning grids for receiving the optical signals corresponding to the image of the scale, and
      (2) a like plurality of optoelectronic receivers arranged to receive the optical signals and to generate electrical signals in response thereto.

2. The optoelectronic incremental measuring system of claim 1, further comprising light filtering grid means disposed in the path of the light from the light source means to the one end of the first fiber optical system, the grid means having a grid line spacing equal to the scale increments of the incremental scale.

* * * * *

UNITED STATES PATENT AND TRADEMARK OFFICE
CERTIFICATE OF CORRECTION

PATENT NO.   :   4,867,568
DATED        :   SEPTEMBER 19, 1989
INVENTOR(S)  :   Rieder HEINZ and Max SCHWAIGER It is certified that error appears in the above-identified patent and that said Letters Patent is hereby corrected as shown below:

Cover page, item 75, line 1, delete "Rieder Heinz" and substitute therefor —Heinz Rieder—.

Signed and Sealed this

Twelfth Day of February, 1991

*Attest:*

HARRY F. MANBECK, JR.

*Attesting Officer*    *Commissioner of Patents and Trademarks*